(12) United States Patent
Son

(10) Patent No.: US 7,327,684 B2
(45) Date of Patent: Feb. 5, 2008

(54) METHOD OF OPERATING, ADMINISTRATING AND MAINTAINING VERY HIGH BIT RATE DIGITAL SUBSCRIBER LINE

(75) Inventor: Young-Mi Son, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1003 days.

(21) Appl. No.: 10/424,826

(22) Filed: Apr. 29, 2003

(65) Prior Publication Data

US 2003/0210772 A1 Nov. 13, 2003

(30) Foreign Application Priority Data

May 13, 2002 (KR) ............ 10-2002-0026133
Apr. 17, 2003 (KR) ............ 10-2003-0024397

(51) Int. Cl.
*H04L 12/26* (2006.01)
*H04J 3/00* (2006.01)
*H04B 1/38* (2006.01)

(52) U.S. Cl. ............... 370/236.2; 370/241.1; 370/529; 375/222

(58) Field of Classification Search ........... 370/241, 370/241.1, 449–457, 230, 395.2; 375/222, 375/231, 269
See application file for complete search history.

(56) References Cited

U.S. PATENT DOCUMENTS 5,905,781 A 5/1999 McHale et al.
6,104,749 A * 8/2000 Lu et al. ............... 375/222
6,219,378 B1 4/2001 Wu
6,226,322 B1 5/2001 Mukherjee
6,389,062 B1 5/2002 Wu
6,873,652 B1 * 3/2005 Palm .................. 375/222
7,035,288 B2 * 4/2006 Spruyt et al. .......... 370/482

OTHER PUBLICATIONS

Tian, Dan, A Management Information Model For Managing Fiber In The Loop (FITL) ATM Access Systems Using CMIP, Apr. 1998, IEEE 0-7803-4351, pp. 169-175.*

* cited by examiner

*Primary Examiner*—Chi Pham
*Assistant Examiner*—Tri H. Phan
(74) *Attorney, Agent, or Firm*—Robert E. Bushnell, Esq.

(57) ABSTRACT

Disclosed is an operation, administration, and maintenance method for very high bit rate digital subscriber line, which has a simplified frame structure, can be easily modified, and can provide various information. In very high bit rate digital subscriber line system which performs a link set between central office and customer premises equipment connected to each other by a very high bit rate digital subscriber line by transmitting/receiving very high bit rate digital subscriber line overhead control frame having operation code, unique operation codes are identically set at the central office and the customer premises equipment. Unique operation codes prescribe all kinds of messages to be transmitted between central office and customer premises equipment. Operation, administration, and maintenance for customer premises equipment is performed by exchanging messages by central office and customer premises equipment in very high bit rate digital subscriber line overhead control frames. Very high bit rate digital subscriber line overhead control frames each has operation code which prescribes corresponding message among set operation codes.

5 Claims, 3 Drawing Sheets

METHOD OF OPERATING, ADMINISTRATING AND MAINTAINING VERY HIGH BIT RATE DIGITAL SUBSCRIBER LINE

CLAIM OF PRIORITY

This application makes reference to, incorporates the same herein, and claims all benefits accruing under 35 U.S.C. § 119 from my applications METHOD OF OPERATION, ADMINISTRATION AND MAINTENANCE OF VERY HIGH BIT RATE DIGITAL SUBSCRIBER LINE filed with the Korean Industrial Property Office on May 13, 2002 and there duly assigned Ser. No. 26133/2002 and on Apr. 17, 2003 and assigned Serial No. 2003-24397.

BACKGROUND OF THE INVENTION

1. Technical Field

The present invention relates to a very high bit rate digital subscriber line, and more particularly to an operation, administration, and maintenance (OAM) method to be used in conjunction with a very high bit rate digital subscriber line (VDSL) standardization.

2. Related Art

In a current high bit rate communication network, a need exists for a broader bandwidth because desire for information by subscribers continuously increases. Therefore, very high bit rate digital subscriber line (VDSL) is newly on the rise as a next generation technology. There is a need for providing operation, administration, and maintenance (OAM) according to a tendency toward very high bit rate digital subscriber line (VDSL) standardization in a standardizing step, because current very high bit rate digital subscriber line (VDSL) is not yet standardized. Operation, administration, and maintenance (OAM) relates to a network management group that provides a network default display, performance information, and data and diagnosis functions.

Very high bit rate digital subscriber line (VDSL), which is one of the high bit rate digital transmission techniques utilizing telephone lines, can modulate and demodulate data of at least 10 megabytes (MB) per second through a copper line in either one direction or in two opposite directions. Currently, a downward transmission rate, transmitting to a subscriber side, is 130 to 52 megabits per second (Mbps). Currently, an upward transmission rate, transmitting to a switching center or central office side, is 1.5 to 2.3 Mbps, and a transmission distance is 0.3 to 1.5 kilometers (km).

The American National Standards Institute (ANSI) T1E1.4 of U.S. and European Telecommunications Standards Institute (ETSI) of Europe are now attempting to arrive at very high bit rate digital subscriber line (VDSL) standardization. In the case of an asymmetric digital subscriber line (ADSL), the transmission rates which are provisionally defined by American National Standards Institute (ANSI) are as follows: 52 Mbps/6.4 Mbps at a distance of 1,000 feet (1 kft) for an apartment building or small town, for example; 26 Mbps/3.2 Mbps at a distance of 3,000 feet (3 kft) for a small residential town, for example; and 13 Mbps/1.6 Mbps at a distance of 4,500 feet (4.5 kft), for a dispersed area or circumstance, such as an agricultural village, for example.

In contrast, in the case of a symmetric digital subscriber line, American National Standards Institute (ANSI) provisionally defines the transmission rate as 26 Mbps at 1 kft and 13 Mbps at 13 kft. Synchronized discrete multi-tone (S-DMT), carrierless amplitude/phase modulation (CAP), quadrature amplitude modulation (QAM), and others, are proposed as a line code. Aspects at issue in the current very high bit rate digital subscriber line (VDSL) standardization efforts are modulation, Power-Back-Off, an upward/downward signal dividing method, a spectrum assignment, a channel multiplexing method, a transmission mode, and others.

Manufacturing companies of the VDSL Coalition group and manufacturing companies of the VDSL Alliance group continue to dispute the VDSL standardization. The manufacturing companies of the VDSL Coalition wants a Single Carrier Modulation (SCM) to be used in the VDSL standardization. The manufacturing companies of the VDSL Alliance wants a Multiple Carrier Modulation (MCM). Manufacturing companies such as Broadcom, Infineon, Globespan, and Lucent belong to the VDSL Coalition. Manufacturing companies such as Alcatel, Texas Instruments, and Cisco belong to the VDSL Alliance group.

As mentioned above, under the circumstances of standardizing and developing very high bit rate digital subscriber line (VDSL), it is essential to realize operation, administration, and maintenance (OAM). Therefore, it is necessary to develop operation, administration, and maintenance (OAM) in accordance with the progress of the standardization.

However, OAM has been developed based on the standard of Broadcom in the VDSL Coalition group. Broadcom provides an OAM having been developed using an embedded operational control (EOC) according to the standard of Broadcom. In order to provide the OAM using EOC, after setting a VDSL link, a special complicated procedure to perform the OAM using EOC is required. EOC has a complicated frame structure including unnecessary parameters. EOC also has a very complicated process for performing OAM in a current VDSL system. OAM has a very complicated frame structure and process of performing OAM. Further, OAM provides insufficient information in many sections.

Exemplars of recent efforts regarding digital subscriber line issues include: U.S. Pat. No. 6,389,062 to Wu, entitled ADAPTIVE FREQUENCY DOMAIN EQUALIZER CIRCUITS, SYSTEMS, AND METHODS FOR DISCRETE MULTITONE BASED DIGITAL SUBSCRIBER LINE MODEM, issued on May 14, 2002, U.S. Pat. No. 6,226,322 to Mukherjee, entitled ANALOG RECEIVE EQUALIZER FOR DIGITAL-SUBSCRIBER-LINE COMMUNICATIONS SYSTEM, issued on May 1, 2001, U.S. Pat. No. 6,219,378 to Wu, entitled DIGITAL SUBSCRIBER LINE MODEM INITIALIZATION, issued on Apr. 17, 2001, and U.S. Pat. No. 5,905,781 to McHale et al., entitled COMMUNICATION SERVER APPARATUS AND METHOD, issued on May 18, 1999.

While these recent efforts provide advantages, I note that they fail to adequately provide an improved method of operating, administrating and maintaining very high bit rate digital subscriber line.

SUMMARY OF THE INVENTION

Accordingly, the present invention has been made to solve the above-mentioned problems, and the present invention provides an operation, administration, and maintenance (OAM) method for very high bit rate digital subscriber line (VDSL), which has a simplified frame structure, can be easily modified, and can provide various information.

The present invention provides an operation, administration, and maintenance (OAM) method for a general very high bit rate digital subscriber line (VDSL), which can be applied to various very high bit rate digital subscriber line (VDSL) chips.

The present invention provides a method for performing operation, administration, and maintenance for a customer premises equipment by a central office in a very high bit rate digital subscriber line system which performs a link set between the central office and the customer premises equipment connected to each other by a very high bit rate digital subscriber line by transmitting/receiving of a very high bit rate digital subscriber line overhead control frame having an operation code, the method comprising the steps of: identically setting unique operation codes at the central office and the customer premises equipment, the unique operation codes prescribing all kinds of messages to be transmitted between the central office and the customer premises equipment in order to perform the operation, administration, and maintenance; and performing the operation, administration, and maintenance for the customer premises equipment by exchanging the messages by the central office and the customer premises equipment in very high bit rate digital subscriber line overhead control frames, and the very high bit rate digital subscriber line overhead control frames each having an operation code among the set operation codes which prescribes a corresponding message.

The present invention provides an operation, administration, and maintenance (OAM) method for a very high bit rate digital subscriber line (VDSL) system, comprising: a switching center transmitting a control frame having an idle code to a subscriber home apparatus when the switching center has recognized a completion of a link setting; the subscriber home apparatus transmitting a response frame having the idle code for the control frame to the switching center when the subscriber home apparatus has received the control frame; and the switching center recognizing an idle state of the system when the switching center has received the response frame.

In accordance with the principles of the present invention, as embodied and broadly described, the present invention provides a method of performing operation, administration, and maintenance for a very high bit rate digital subscriber line system, the method comprising: transmitting a control frame from a switching center to a subscriber home apparatus in a when the switching center recognizes a completion of a link setting, the control frame having an idle code; transmitting a response frame from the subscriber home apparatus to the switching center when the subscriber home apparatus receives the control frame, the response frame having the idle code; and recognizing an idle state of the very high bit rate digital subscriber line system when the switching center receives the response frame.

In accordance with the principles of the present invention, as embodied and broadly described, the present invention provides an apparatus for performing an operation, administration, and maintenance method for a very high bit rate digital subscriber line system, the apparatus comprising: a switching center transmitting a control frame when said switching center detects a completion of a link setting, the control frame including an idle code, said switching center performing at least a portion of an operation, administration, and maintenance method for a very high bit rate digital subscriber line system; and a customer premises unit receiving the control frame from said switching center, said customer premises unit transmitting a response frame to said switching center in response to receiving the control frame, the response frame including the idle code, said switching center detecting an idle state of the very high bit rate digital subscriber line system when said switching center receives the response frame.

In accordance with the principles of the present invention, as embodied and broadly described, the present invention provides an apparatus for performing an operation, administration, and maintenance method for a very high bit rate digital subscriber line system, the apparatus comprising: a customer premises unit continuously transmitting an operation code and data for the very high bit rate digital subscriber line system; and a switching center receiving the operation code and data from said customer premises unit, said switching center transmitting at least the operation code to said customer premises unit in response to receiving the operation code and data from said customer premises unit, said customer premises unit ending the continuous transmission of the operation code and data in response to receiving the operation code from said switching center.

In accordance with the principles of the present invention, as embodied and broadly described, the present invention provides a method of performing operation, administration, and maintenance for a very high bit rate digital subscriber line system, the method comprising: detecting a completion of a link setting; transmitting a control frame when said detecting is performed, the control frame including an idle code; receiving the control frame; transmitting a response frame in response to receiving the control frame, the response frame including the idle code; receiving the response frame; and recognizing an idle state of the very high bit rate digital subscriber line system when said receiving of the response frame is performed.

In accordance with the principles of the present invention, as embodied and broadly described, the present invention provides a method for providing operation, administration, and maintenance of customer premises equipment from a central office in a very high bit rate digital subscriber line system by transmitting and receiving a very high data rate digital subscriber line overhead control frame including an operation code, the method comprising: setting unique operation codes identically at the central office and the customer premises equipment, the unique operation codes prescribing a plurality of types of messages to be transmitted between the central office and the customer premises equipment for performing the operation, administration, and maintenance; and performing the operation, administration, and maintenance of the customer premises equipment by exchanging selected ones of the messages between the central office and the customer premises equipment in very high bit rate digital subscriber line overhead control frames, with the very high bit rate digital subscriber line overhead control frames each including an operation code selected from among the unique operation codes to prescribe type of corresponding message.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF EMBODIMENTS FOR CARRYING OUT THE INVENTION

Figure 1:
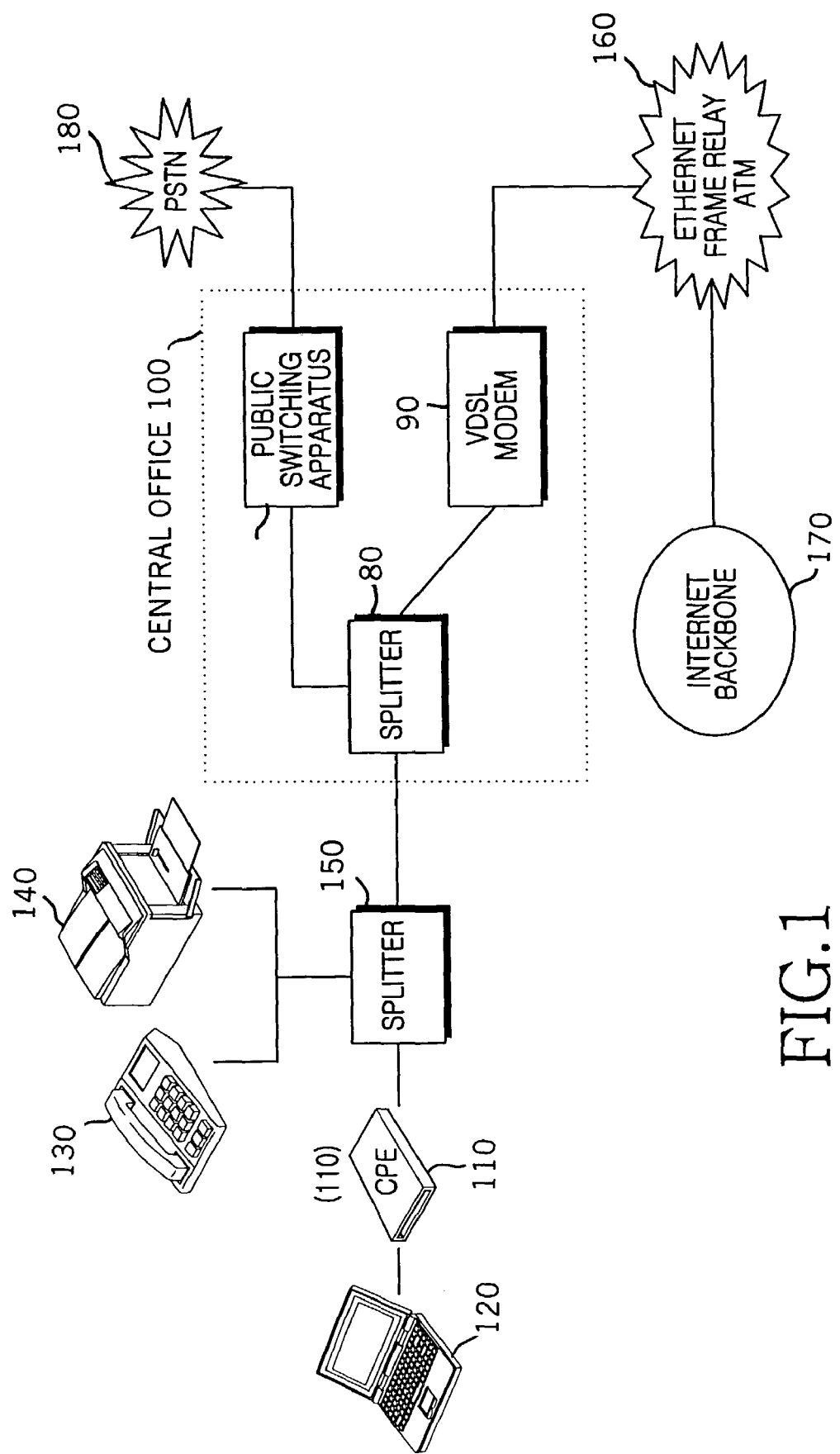
FIG. 1 is a diagram showing a network structure of very high bit rate digital subscriber line (VDSL), in accordance with the principles of the present invention.

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Hereinafter, an operation, administration, and maintenance (OAM) method for very high bit rate digital subscriber line (VDSL) according to a preferred embodiment of the present invention will be described with reference to the accompanying drawings. It should be kept in mind that the same reference numerals are used at the same parts in the accompanying drawings. In the following description of the present invention, a detailed description of known functions and configurations incorporated herein will be omitted when it may make the subject matter of the present invention rather unclear.

In general, operation, administration, and maintenance (OAM) for a system is a method of testing whether a system operates normally or does not operate normally. Operation, administration, and maintenance (OAM) for a communication network is a method of testing whether a transmission path of data and a communication apparatus are operated in a normal state. Therefore, the present invention tests whether a data transmission between a CO (central office) and a CPE (customer premises equipment) is performed in a normal state. The customer premises equipment is typically located at the premises of a customer, as the name implies, and can also be referred to as a customer premises unit.

A frame structure transmitted and received to perform an OAM using the EOC is typically complicated. In order to perform the OAM using the EOC, after a link setup is completed between the central office and a CPE, a specially complicated process to perform the OAM using the EOC is required. However, according to the present invention, since a VOC frame used during the link setup is also used in the OAM as described later, the frame structure according to the present invention is simpler than that of a typical EOC. Furthermore, since the OAM is performed using the VOC frame used during the link setup, the OAM is performed without delay after the link setup without the specially complicated process required in the method using the EOC.

FIG. 1 is a diagram showing a network structure of very high bit rate digital subscriber line (VDSL), in accordance with the principles of the present invention. The FIG. 1 shows consumer premises equipment 110 connected to a computer 120 and a splitter 150, with the splitter 150 being connected to a printer/facsimile system 140 and a telephone 130. The FIG. 1 also shows a central office 100 connected to the splitter 150, to an ethernet frame relay asynchronous transfer mode (ATM) 160, and to a public switched telephone network 180. The FIG. 1 shows that the ethernet frame relay asynchronous transfer mode (ATM) 160 is connected to Internet backbone 170. As shown in FIG. 1, the central office 100 includes a splitter 80, a very high bit rate digital subscriber line (VDSL) modem 90, and a public switching apparatus 70. According to the present invention, operation, administration, and maintenance (OAM) is performed using a handshake method between the central office (CO) 100 and the customer premises equipment (CPE) 110 of FIG. 1. The handshake method signifies a method having a structure capable of confirming an opening of communication between a transmitting part and receiving part by sending different signals to each other. That is, the present invention accomplishes the operation, administration, and maintenance (OAM) by transmitting and receiving data between the central office (CO) 100 and the customer premises equipment (CPE) 110.

The central office (CO) 100 is a term that designates a local office connected with subscriber lines toward homes and companies. The central office (CO) 100 has switching equipment for switching local calls, long distance calls, or international calls. For this reason, the central office (CO) 100 can be referred to as a switching center 100. The customer premises equipment (CPE) 110 is an end apparatus connected with a network provided by a communication service provider. For example, a customer premises equipment (CPE) 110 may be a terminal, a set-top box, a cable modem, xDSL modem, or other device. Here the term xDSL is a generic term for a variety of different digital subscriber line (DSL) technologies.

The customer premises equipment (CPE) 110 can be referred to as a subscriber home apparatus 110. Since the data transmission between the switching center 100 and the customer premises equipment (CPE) 110 is defined in the very high bit rate digital subscriber line (VDSL) standard, it is understood in the art that there is no need to describe the data transmitting and receiving function for operation, administration, and maintenance (OAM) of the present invention. Hereinafter, an apparatus, which is operated according to the very high bit rate digital subscriber line (VDSL) standard and performs data transmission and reception and analysis functions for operation, administration, and maintenance (OAM) of very high bit rate digital subscriber line (VDSL), is particularly referred to as "OAM apparatus".

The present invention provides a process of transmitting and receiving data between the switching center 100 and the subscriber home apparatus 110, so as to accomplish the operation, administration, and maintenance (OAM) by the handshake method. The data transmitted between the switching center 100 and the subscriber home apparatus 110 are VOC (VDSL overhead control) frames.

A VDSL overhead control (VOC) frame is generally used in a link setup, but in the present invention, VOC frames are used for the same purpose that an embedded operational control (EOC) frame is used, that is, for maintenance after performing the link setup. In the present invention, VDSL overhead control (VOC) frames are used for maintenance after performing the link setup. A link setting is for maintenance after completing the link setting between VDSL CO and CPE.

Figure 2:
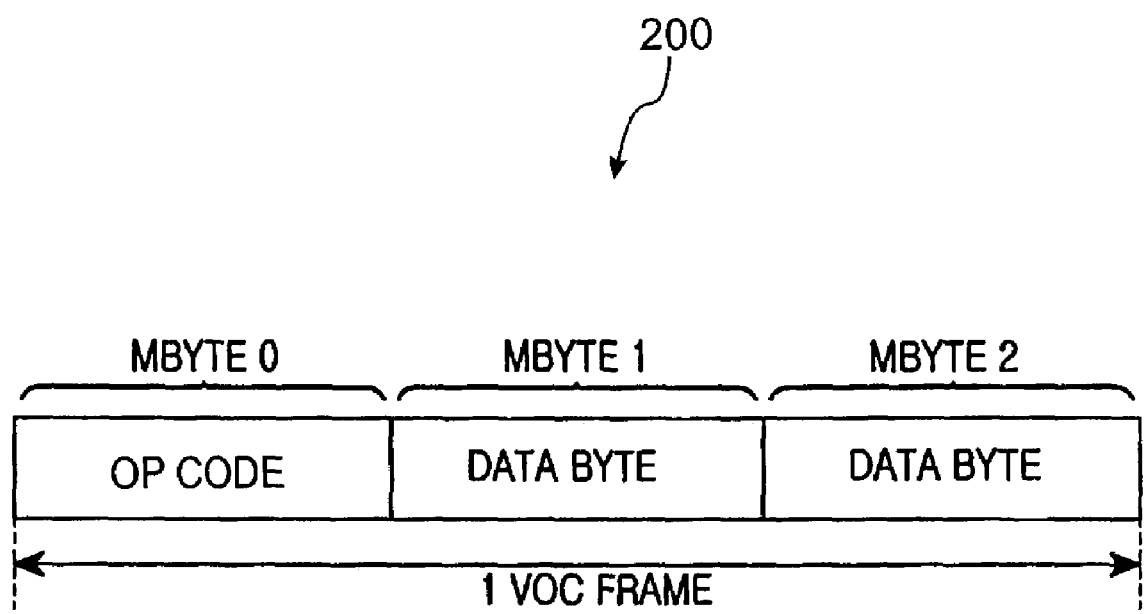
FIG. 2 is a table illustrating a VDSL overhead control (VOC) frame format used for performing operation, administration, and maintenance (OAM) for very high bit rate digital subscriber line (VDSL), in accordance with the principles of the present invention.

FIG. 2 is a table illustrating a VDSL overhead control (VOC) frame format used for performing operation, administration, and maintenance (OAM) for very high bit rate digital subscriber line (VDSL) between CO 100 and CPE 110, in accordance with the principles of the present invention. As depicted in FIG. 2, the VDSL overhead control (VOC) frame 200 includes data and an operation code (OP code) for identifying a transmission frame information data (data byte MBYTE 1), and a data byte (data byte MBYTE2).

Unique operation codes are identically set at the CO 100 and the CPE 110 in order to perform the OAM of the VDSL system. The unique operation codes prescribe all types of messages to be transmitted between the CO 100 and the CPE 110. The unique operation codes prescribe all kinds of messages to be transmitted between the CO 100 and the CPE 110. That is, the operation codes prescribe messages such as a request, a response, a confirmation, and a reporting between the CO 100 and the CPE 110. For example, when the CO 100 transmits a VOC frame having a predetermined OP code to the CPE 110, the CPE 110 receives and confirms the VOC frame from the CO 100 and sends requested information to the CO 100 or performs a set operation according to the predetermined operation code of the VOC frame. The CO 100 and the CPE 110 confirm the OP code of the received VOC frame to confirm what the meaning of the message transmitted in the VOC frame is. In other words, the CO 100 and the CPE 110 verify the OP code of the received VOC frame to confirm what the meaning of the message transmitted in the VOC frame is.

An example of the OP code which is previously set between the CO 100 and the CPE 110 will be explained with reference to table 1.

TABLE 1

| OP code | Set information |
| --- | --- |
| 0x00 | Idle state request |
| 0x01 | Idle state response |
| 0x02 | Serial Number request |
| 0x03 | Serial Number response |
| 0x04 | Vender ID request |
| 0x05 | Vender ID response |
| 0x06 | Version (S/W, H/W) request |
| 0x07 | Version (S/W, H/W) response |
| 0x08 | Power loss (LPR: Loss of Power Report) request |
| 0x09 | Power loss (LPR: Loss of Power Report) request |
| . | . |
| . | . |

Referring to table 1, codes 1x00 and 0x01 among the OP codes are codes which represent a request of an idle state request and a response to the idle state request, respectively. Codes 0x02 and 0x03 are codes which represent the request of a serial number of the CPE 110 and the response to the serial number request of the CPE 110, respectively. Codes 110, 0x04 and 0x05 are codes which represent the request of a Vender ID of the CPE 110 and the response to the request of the Vender ID of the CPE 110, respectively. Codes 0x06 and 0x07 are codes which represent the request of a version (S/W, H/W) of the CPE 110 and the response to the request of the version (S/W, H/W) of the CPE 110, respectively. Codes 0x08 and 0x09 are codes which represent the request of a power loss (loss of power report: LPR) of the CPE 110 and the response to the request of the power loss (loss of power report: LPR) of the CPE 110, respectively. As noted above, OP codes for information request and a response thereto are previously set between the CO 100 and the CPE 110. In table 1, the case that 10 kinds of OP codes are set is described in table 1. However, it is understood that all system information used in VDSL OAM data can be set.

When the OP code for prescribing all kinds of messages to be transmitted between the CO 100 and the CPE 110 is set, a process that the CO 100 requests the CPE 110 to send a Vender ID will be described with reference to tables 2 and 3.

TABLE 2

| OP code | 0x04 |
| --- | --- |
| MBYTE1 | Data Byte |
| MBYTE2 | Data Byte |

The CO 100 transmits a VOC frame having "0x04" OP code as shown in table 2 to the CPE 110 in order to request the CPE 110 to send a Vender ID. The CPE 110 receives the VOC frame from the CO 100, and compares OP codes included in the received VOC frame with previously set OP codes shown in table 1. The CPE 110 confirms whether or not the received VOC frame is a message for requesting the Vender ID by confirming an OP code included in the received VOC frame. That is, the CPE 110 recognizes that the received VOC frame is a message for requesting the Vender ID by confirming an OP code of "0x04" included in the received VOC frame as shown in table 2. Then, the CPE 110 transmits a VOC frame constructed as shown in table 3 to the CO 100. The VOC frame includes the Vender ID which requests the CO 100 to send and an OP code. The OP code prescribes that the received VOC frame is a message for transmitting the Vender ID.

TABLE 3

| OP code | 0x05 |
| --- | --- |
| MBYTE1 | Vender ID |
| MBYTE2 | Data Byte |

The CO 100 which received the VOC frame as shown in table 3 judges whether or not the received VOC frame has a Vender ID by confirming an OP code of the received VOC frame. As stated above, according to the present invention, unique OP codes for prescribing all kind of messages to be transmitted between the CO 100 and the CPE 110 are previously sets. Then, the CO 100 and the CPE 110 exchange a VOC frame having an OP code for prescribing a corresponding message with each other to perform the OAM. That is, as stated above, the CO 100 and the CPE 100 determines which data are to be transmitted and what the received data are by confirming the OP code of the VOC frame. The CO 100 and the CPE 100 receive each VOC frame, and compares the OP code of the VOC frame with a previously set OP code, so as to confirm what is the meaning of the received data. Then, the CO 100 and the CPE 100 output the confirmed result through a display means such as a screen.

Figure 3:
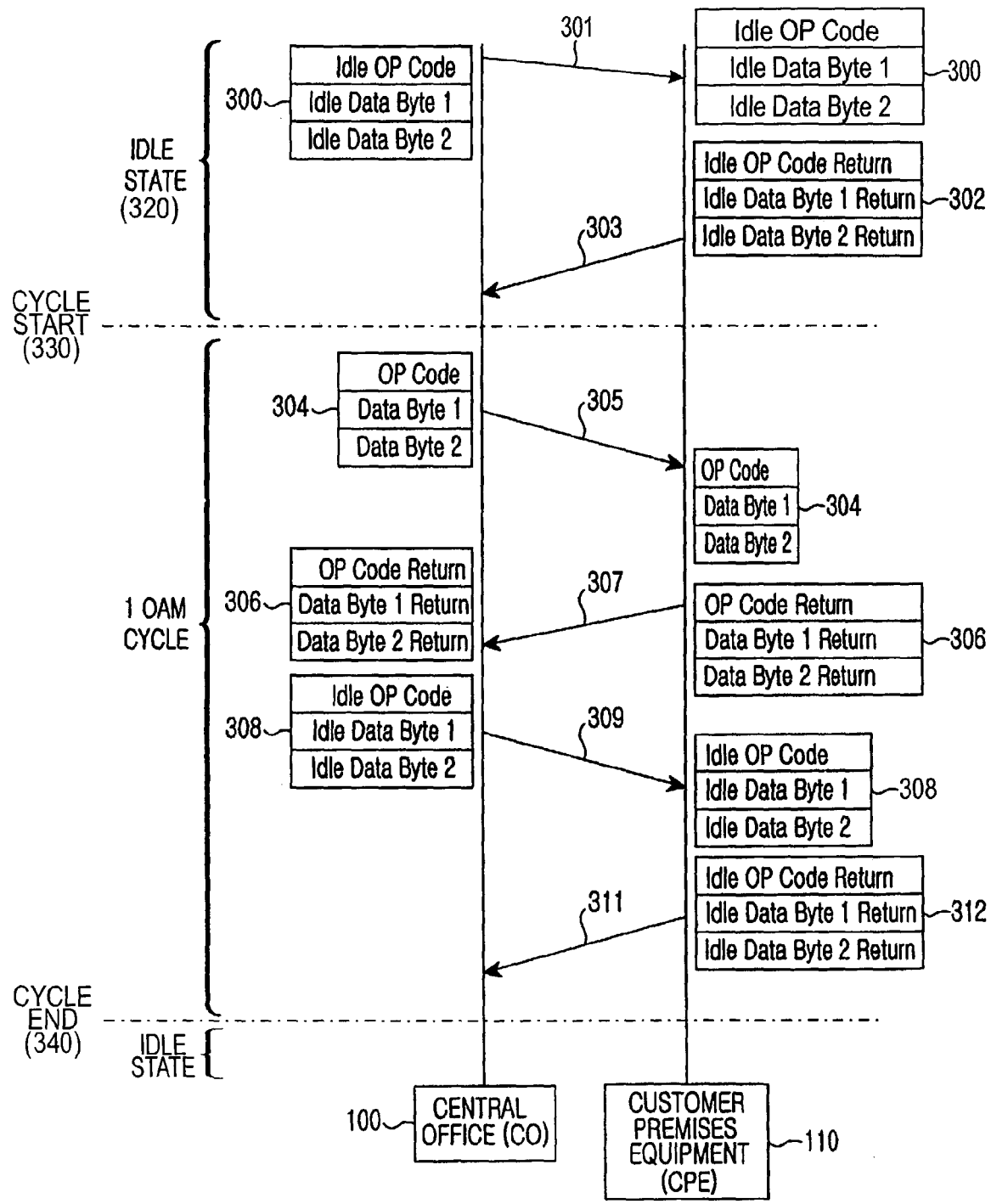
FIG. 3 is a diagram illustrating a data flow between central office (CO) and customer premises equipment (CPE) for performing operation, administration, and maintenance (OAM) for very high bit rate digital subscriber line (VDSL), in accordance with the principles of the present invention.

FIG. 3 is a diagram illustrating a data flow between central office (CO) and customer premises equipment (CPE) for performing operation, administration, and maintenance (OAM) for very high bit rate digital subscriber line (VDSL), in accordance with the principles of the present invention. As one embodiment of a method of accomplishing a process of transmitting data related to the operation, administration, and maintenance (OAM), an operation of writing and reading out data on and from registers of the operation, administration, and maintenance (OAM) apparatus will be described below. When the operation of writing and reading out data on and from the registers in the CO 100 and the CPE 110, in order to exchange data between the CO 100 and CPE 110, is applied to products manufactured by Broadcom, the operation can be performed by instructions as follows:

Reading: qam_read (MB_R, SB_register name, &ival, &qval)

Writing: qam_write (SB_W, MB_register name, ival, qval).

In the above instructions, the second factor indicates reading and writing registers. Thus, when the CO 100 and CPE 110 perform the reading operation, the operation, administration, and maintenance (OAM) apparatus reads out data from the register indicated by the register name denoted at the second factor, that is, SB_register name. When the operation, administration, and maintenance (OAM) apparatus performs the writing operation, the operation, administration, and maintenance (OAM) apparatus writes data on the register indicated by the register name denoted at the second factor, that is, MB_register name.

VDSL overhead control (VOC) registers currently used in the products manufactured by Broadcom are as follows:

MB_LDRXCB is a register used for the reading operation of the VDSL overhead control (VOC) frame; and MB_STTXCB is a register used for the writing operation of the VDSL overhead control (VOC) frame.

Further, registers used for data in the products manufactured by Broadcom are as follows:

MB_LDAI is a receiving power register;

MB_LDSNRE is an estimated signal to noise ratio (SNR) and average SNR register;

MB_LDRXFCT is a forward error correction (FEC) (per/post) error register;

MB_LDEHEC is a header error control (HEC) register; and

SB_TX_DAC is a TX_DAC (digital to analog converter) register.

The MB used for indicating the registers denotes multi byte, and the SB denotes a single byte. The registers are used to exchange messages between the CO 100 and the CPE 110 according to the present invention. For example, when the CO 100 transmits a VOC frame as shown in table 2 to the CPE 110 in order to request the CPE 110 to send a Vender ID, the CPE 110 confirms whether or not the received VOC frame is a message for requesting the Vender ID by confirming an OP code included in the received VOC frame. Then, the CPE 110 reads the Vender ID out of a VOD register. The Vender ID is stored in the VOD register. Then CPE 100 transmits VOD frame data as shown in table 3 to the CO 100. The VOD frame data includes the Vender ID and an OP code used during a transmission of the Vender ID. The CO 100 and CPE 110 take out data by the operation of reading out values from the registers and writing the values on the registers, and output the data.

System information used for VDSL OAM data includes a serial number, a vender identifier (ID), a version (software, hardware), loss of power report (LPR), and other information. Of course, while the sample register names have been shown for helping to understand the present invention, it will be understood by those skilled in the pertinent art that the present invention is not limited by those names. Also, the present invention can be implemented by performing operations that are similar to, but not necessarily identical to, the operations performed by the sample registers.

In accordance with the present invention, after the link setup between the CO 100 and the CPE 110 is completed, the OAM operation is performed. As soon as the link setup is completed, the CO 100 and the CPE 110 inform other sides that they become in a state to exchange inform by transmitting an Idle OP code to the other sides, respectively. The Idle OP code prescribes a message indicating that the CO 100 and the CPE 100 are in idle states. That is, after the CO 100 or the CPE 110 confirms that the other sides are in idle states, they exchange messages with each other.

Hereinafter, with reference to FIG. 3, a process shall be described relating to transmitting data between the switching center 100 and the subscriber home apparatus 110 using an OP code of a VOC frame wherein the VOC frame is previously set between the CO 100 and 110. FIG. 3 is a diagram illustrating a data flow between CO 100 and CPE 110 for performing OAM for VDSL according to the present invention.

As soon as the link setup is completed, the CO 100 and the CPE 110 transmit an Idle OP code to each other. The Idle OP code indicates that each of the CO 100 and the CPE 110 is in an idle state (320). When OP codes are set as shown in table 1, the CO 100 and the CPE 110 transmit a VOC frame having an OP code of "0x01" to the other sides.

The steps 301 and 303 are steps wherein the CO 100 confirms whether or not the CPE 110 is in an idle state after the link setup is completed between the CO 100 and the CPE 110. That is, the steps 301 and 303 are steps wherein the CO 100 verifies whether or not the CPE 110 is in an idle state after the link setup is completed between the CO 100 and the CPE 110.

First, at step 301, the CO 100 transmits an idle state request VOC frame 300 including Idle Op code to the CPE 100. The OP code is a code which prescribes a message for requesting an idle state confirmation. The VOC frame includes only OP code. The CPE 110 receives the VOC frame 300 from the CO 100 and reads an OP code included in the VOC frame 300. The CPE 110 compares the read OP code with set OP codes, and judges whether or not the VOC frame 300 is a message for requesting an idle state confirmation according to the comparison result. At step 303, when the CPE 110 is in the idle state, the CPE 110 transmits a VOC frame 302 having an Idle OP Code Return to the CO 100. The Idle OP Code Return is an OP code which prescribes a message for a response to the idle state request. The CO 100 receives the Idle OP Code Return from the CPE 110 and recognizes that the CPE 110 is in an idle state.

At step 305, when the CO 100 requests the CPE 110 to send OAM information, the CO 100 transmits an information request VOC frame 304 having an OP code among set OP codes. The OP code is an OP code for prescribing the OAM information. In such a case, one cycle is started (330). The CPE 110 receives the information request VOC frame 304 having the OP code, compares the OP code of the information request VOC frame 304 with a previously set OP code, and recognizes requested information according to the comparison result. Then, at step 307, the CPE 110 reads the requested information out of a VOC register, and transmits an information response VOC frame 306 to the CO 100. The information response VOC frame 306 includes the request information and an OP code for prescribing a message indicating a response to the information which the CO 100 has requested. The CO 100 receives and confirms the information response VOC frame 306 from the CPE 110. At step 309, when the data transmission using the VOC frame 306 including Op code is completed, the CO 100 transmits the VOC frame 308 including Idle Op code to the CPE 110.

One cycle is completed when CPE 110 receives VOC frame 308 (step 309), transmits VOC frame 312 with Idle OP code return (step 311), and CO 100 receives VOC frame 312 (step 3 1), and the state is changed into an idle state (320). When a response is not generated during three seconds from when a request is generated from the CO 100 side to the CPE 110, the state is changed into an idle state. At this time, it is determined by the CO 100 whether or not the request is again performed according to circumstances.

For example, in the case that an OP code is set as shown in table 1 between the CO 100 and the CPE 110, when the CO 100 requests the CPE 110 to send a Serial number, the CO 100 transmits a VOC frame 304 shown in table 4 to the CPE 110 (step 305).

TABLE 4

| OP code | 0x02 |
|---|---|
| MBYTE1 | Data Byte |
| MBYTE2 | Data Byte |

At step 305, when the CO 100 transmits the VOC frame 304 as shown in table 4 in order to request the CPE 110 to send a Serial number, the CPE 110 compares an OP code included in the received VOC frame 304 with a previously set OP code. The CPE 110 judges whether or not the received VOC frame 304 is a message for requesting the Serial number by confirming the OP code included in the received VOC frame 304. At step 307, the CPE 110 simultaneously sets and transmits both the Serial number and an OP code, as shown in table 5, to the CO 100. The OP code prescribes that the received VOC frame is a message for transmitting the Serial number.

TABLE 5

| OP code | 0x03 |
|---|---|
| MBYTE1 | Serial Number |
| MBYTE2 | Data Byte |

The CO 100 receives the VOC frame 306 shown in table 5 and recognizes that a Serial Number is received by confirming an OP code in the received VOC frame 306. That is, as noted above, the CO 100 and the CPE 110 confirm the OP code included in the received VOC frame in order to confirm a meaning of the messaged transmitted between the CO 100 and the CPE 110. In the same manner as steps 301 and 303, the CO 100 transmits a VOC frame 308 as shown in table 6 to the CPE 110 to be changed to the idle state (320), at step 309.

TABLE 6

| OP code | 0x00 |
|---|---|
| MBYTE1 | Data Byte |
| MBYTE2 | Data Byte |

The CPE 110 receives the VOC frame 308 as shown in table 6, and judges whether the CO 100 is in the idle state by confirming an OP code included in the received VOC frame 308. Then, at step 311, the CPE 110 transmits a VOC frame 312 having an OP code as shown in table 7 to the CO 100. The OP code prescribes a message indicating that the CPE 110 is in an idle state (320).

TABLE 7

| OP code | 0x01 |
|---|---|
| MBYTE1 | Data Byte |
| MBYTE2 | Data Byte |

The present invention has been described with reference to a case which transmits a VOC frame to the CPE 110 in response to a request of the CO 100. However, when necessary, the transmission can be made even in the case where a request is not generated from the CO 100 to the CPE 110. In this case, when the CPE 110 transmits a VOC frame having an OP code to the CO 100, the CO 100 receives the VOC frame having the OP code and performs the same steps as steps 305 through 307. The OP code prescribes a corresponding message. In this case, the CPE 100, executing steps 305 through 307 functions as a master. As described previously, when the CPE 110 transmits data to the CO 100 without a request from the CO 100, the CPE 110 transmits the VOC frame having an Op code for prescribing the corresponding message, and the CPE 100 continuously transmits a VOC frame having the same OP code until the CO 100 transmits a VOC frame having an OP code corresponding to the transmitted VOC frame to the CPE 110. When the CO 100 transmits the Op code, the same process is performed. As a result, when master authority is simultaneously given to both the CO 100 and the CPE 110, the CO 100 and CPE 110 are prevented from simultaneously sending a request to each other, and thereby the state of the apparatus is prevented from shifting into an abnormal state.

When necessary, the data transmission can be made even in the case where a request is not transmitted from the switching center 100 to the subscriber home apparatus 110. Accordingly, when the subscriber home apparatus 110 transmits appropriate operation code (OP code), the switching center 100 operates as if the switching center 100 had initiated the process with a request.

When the subscriber home apparatus 110 transmits data to the switching center 100 without a request from the switching center 100, the subscriber home apparatus 110 transmits an operation code (OP code), and the subscriber home apparatus 110 continuously transmits the same operation code (OP code) until the switching center 100 transmits an operation code (OP code), corresponding to the transmitted operation code (OP code), to the subscriber home apparatus 110. Under these conditions, when the switching center 100 finally transmits the operation code (OP code), the above-described process is performed, as shown by steps S305 through S311 in FIG. 3, as if the switching center 100 had sent a request and as if the subscriber home apparatus 110 had sent a response.

As a result, when master authority is simultaneously given to either the central office (CO) or the customer premises equipment (CPE), the central office (CO) and customer premises equipment (CPE) are prevented from simultaneously sending a request to each other, and thereby the state of the apparatus is prevented from shifting into an abnormal state.

As mentioned above, since the present invention does not use an embedded operational channel (EOC) wherein the embodiment of the EOC is complicated, but instead uses a VOC used for a link setup in order to perform an OAM, the OAM with respect to a VDSL system is easily embodied. As stated above, the present invention uses a VOC frame to perform the OAM between the CO and the CPE wherein a structure of the VOC frame is simpler than that of the EOC. The VOC frame used during a VDSL link setup in a VDSL system is used to perform the OAM. Accordingly, the OAM is performed without delay after the link setup without the specially complicated process required in the method using the EOC. Also, the VOC frame generally used in a VDSL is used, the OAM is performed in any VDSL regardless of a standard.

While the invention has been shown and described with reference to certain preferred embodiments thereof, it will be understood by those skilled in the art that various changes in form and details may be made therein without departing from the spirit and scope of the invention. For example, The present invention has been described with reference to requesting a serial number from the CO to the CPE. The CO can request the CPE to send all information for VDSL OAM. Also, the present invention has been explained with reference to a case that the CO requests the CPE to send VDSL OAM information. However, the CPE requests the CO to send the VDSL OAM information.

Therefore, the present invention provides an operation, administration, and maintenance (OAM) which can be more easily realized and has more efficient performance than the existing operation, administration, and maintenance (OAM) manufactured by Broadcom. Also, the present invention provides a general operation, administration, and maintenance (OAM) which can be used in other chips as well as in those manufactured by Broadcom.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method for providing operation, administration, and maintenance of customer premises equipment from a central office in a very high bit rate digital subscriber line system by transmitting and receiving a very high data rate digital subscriber line overhead control frame including an operation code, the method comprising the steps of:

setting unique operation codes identically at the central office and the customer premises equipment, the unique operation codes prescribing a plurality of types of messages to be transmitted between the central office and the customer premises equipment for performing the operation, administration, and maintenance; and performing the operation, administration, and maintenance of the customer premises equipment by exchanging selected ones of the messages between the central office and the customer premises equipment in very high bit rate digital subscriber line overhead control frames, each of the very high bit rate digital subscriber line overhead control frames including an operation code selected from among the unique operation codes to prescribe a type of a corresponding message;

wherein said step of performing the operation administration, and maintenance further comprises:

confirming an idle state of the customer premises equipment by the central office by exchanging an idle state confirmation message between the central office and the customer premises equipment in the very high data rate digital subscriber line overhead control frames; and confirming information for the operation, administration, and maintenance of the customer premises equipment by the central office by exchanging a first message requesting the operation, administration, and maintenance information, and by exchanging a second message responding to the first message in the very high bit rate digital subscriber line overhead control frames by the central office and the customer premises equipment, the second message corresponding to a response message in response to the first message.

2. The method of claim 1, said confirming of the idle state of the customer premises equipment further comprising:

transmitting an idle state request very high bit rate digital subscriber line overhead control frame, having an operation code prescribing a message for requesting an idle state confirmations, to the customer premises equipment by the central office;

receiving the idle state request very high bit rate digital subscriber line overhead control frame from the central office, and transmitting an idle state response very high bit rate digital subscriber line overhead control frame, having an operation code prescribing a response message responding to the idle state confirmation requests, to the central office by the customer premises equipment when the customer premises equipment is in an idle state; and receiving the idle state response very high bit rate digital subscriber line overhead control frame from the customer premises equipment, and confirming when the customer premises equipment is in the idle state by the central office.

3. The method of claim 1, said performing of the operation, administration, and maintenance further comprising:

after said confirming of the information for the operation, administration, and maintenance of the customer premises equipment by the central office by exchanging the first and second messages, verifying the idle state of the customer premises equipment by the central office by exchanging the idle state confirmation message in the very high data rate digital subscriber line overhead control frames by the central office and the customer premises equipment.

4. The method of claim 3, said confirming of the idle state of the customer premises equipment and said verifying of the idle state of the customer premises equipment each further comprising:

transmitting an idle state request very high bit rate digital subscriber line overhead control frame, having an operation code prescribing a message for requesting an idle state confirmation, to the customer premises equipment by the central office;

receiving the idle state request very high bit rate digital subscriber line overhead control frame from the central office and transmitting an idle state response very high bit rate digital subscriber line overhead control frame, having an operation code prescribing a response message responding to the idle state confirmation request, to the central office by the customer premises equipment when the customer premises equipment is in an idle state; and receiving the idle state response very high bit rate digital subscriber line overhead control frame from the customer premises equipment, and confirming when the customer premises equipment is in the idle state by the central office.

5. The method of claim 1, said confirming of the information for the operation, administration, and maintenance of the customer premises equipment further comprising:

transmitting an information request very high bit rate digital subscriber line overhead control frame, having an operation code selected from among the set operation codes prescribing the message requesting the operation, administration, and maintenance information, by the central office;

transmitting an information response very high bit rate digital subscriber line overhead control frame, having information requested by the central office and an operation code prescribing a response message responding to the requested information, to the central office by the customer premises equipment when the customer premises equipment receives the information request very high bit rate digital subscriber line overhead control frame from the central office; and receiving the information response very high bit rate digital subscriber line overhead control frame from the customer premises equipment, and confirming the information that the customer premises equipment transmitted.

* * * * *